United States Patent
Schug et al.

(10) Patent No.: US 9,610,632 B2
(45) Date of Patent: Apr. 4, 2017

(54) METHOD AND APPARATUS FOR FEEDING JOINING ELEMENTS

(71) Applicants: Alexander Schug, Giessen (DE); Florian Steinmuller, Giessen (DE); Manuel Spiess, Giessen (DE); Simon Dietz, Giessen (DE)

(72) Inventors: Alexander Schug, Giessen (DE); Florian Steinmuller, Giessen (DE); Manuel Spiess, Giessen (DE); Simon Dietz, Giessen (DE)

(73) Assignee: NEWFREY LLC, Newark, DE (US)

( * ) Notice: Subject to any disclaimer, the term of this patent is extended or adjusted under 35 U.S.C. 154(b) by 700 days.

(21) Appl. No.: 13/622,805

(22) Filed: Sep. 19, 2012

(65) Prior Publication Data
US 2013/0071209 A1 Mar. 21, 2013

(30) Foreign Application Priority Data
Sep. 21, 2011 (DE) .................. 10 2011 113 832

(51) Int. Cl.
*B25C 5/02* (2006.01)
*B25C 5/06* (2006.01)
(Continued)

(52) U.S. Cl.
CPC .............. *B21J 15/32* (2013.01); *B23P 19/005* (2013.01)

(58) Field of Classification Search
CPC ... B65H 1/00; B21J 15/32; B21J 15/10; B21J 15/28; B21J 15/323; B25B 23/06; B25B 23/04; B25B 31/00
(Continued)

(56) References Cited

U.S. PATENT DOCUMENTS 3,448,236 A * 6/1969 Spisak .................. B23K 9/206
193/44
3,477,192 A * 11/1969 Brown .................. B65B 31/025
206/205
(Continued)

FOREIGN PATENT DOCUMENTS

CN 201089139 Y 7/2008
CN 201227678 Y 4/2009
(Continued)

OTHER PUBLICATIONS

International Preliminary Report on Patentability as issued for International Application No. PCT/EP2012/067789, dated Apr. 3, 2014.
(Continued)

*Primary Examiner* — Robert Long
(74) *Attorney, Agent, or Firm* — Pillsbury Winthrop Shaw Pittman LLP

(57) ABSTRACT

A method and apparatus for feeding joining elements to a joining tool is presented. The joining tool may be movable by a programmable handling unit, and a magazine for receiving at least one joining element may be mounted on the joining tool. The magazine may be moved to a filling station that has a tubular section with an outlet opening. An inlet opening of the magazine may be oriented in relation to the outlet opening. At least one joining element may be conveyed to the tubular section so that it passes through the tubular section, the outlet opening, the inlet opening, and into the magazine. During the orienting, the magazine may be oriented in relation to the outlet opening such that the magazine is spaced apart from the filling station during the conveying of the at least one joining element.

13 Claims, 3 Drawing Sheets

(51) Int. Cl.
*B21J 15/32* (2006.01)
*B23P 19/00* (2006.01)

(58) Field of Classification Search
USPC .................................................. 227/120–155
See application file for complete search history.

(56) References Cited

U.S. PATENT DOCUMENTS

| | | | | |
|---|---|---|---|---|
| 3,893,232 A | * | 7/1975 | Fletcher | H05K 13/0452 221/95 |
| 3,977,483 A | * | 8/1976 | Greanias | G01G 15/04 177/1 |
| 4,180,195 A | | 12/1979 | Caley et al. | |
| 4,208,153 A | * | 6/1980 | Trethewy | B23P 19/003 221/124 |
| 4,265,013 A | * | 5/1981 | Brown | H05K 13/043 227/110 |
| 4,820,108 A | * | 4/1989 | Kneer | B65G 69/0466 198/641 |
| 5,299,408 A | * | 4/1994 | Dupont | B67B 1/04 53/109 |
| 5,916,110 A | * | 6/1999 | Sanfilippo | B65B 31/028 141/63 |
| 6,167,607 B1 | * | 1/2001 | Pryor | A01B 69/008 29/407.04 |
| 6,457,299 B1 | * | 10/2002 | Schwenke | B65B 31/025 53/110 |
| 8,950,049 B2 | * | 2/2015 | Williams | B21J 15/32 227/3 |
| 2003/0233812 A1 | * | 12/2003 | Rogers | B65B 3/32 53/410 |
| 2005/0178816 A1 | * | 8/2005 | Stevenson | B21J 15/027 228/112.1 |
| 2006/0097024 A1 | * | 5/2006 | Matthews | B21J 15/025 227/119 |
| 2007/0289354 A1 | * | 12/2007 | Reiter | B21J 15/32 72/424 |
| 2008/0247844 A1 | * | 10/2008 | Hartrampf | B21J 15/043 414/4 |
| 2009/0013648 A1 | * | 1/2009 | Mastio | A61L 2/082 53/426 |
| 2009/0266866 A1 | * | 10/2009 | Davies | B23P 19/001 227/139 |
| 2010/0325879 A1 | * | 12/2010 | Schmidt | B25B 23/06 29/811.2 |
| 2011/0290848 A1 | * | 12/2011 | Wenzel | B21J 15/32 227/120 |
| 2012/0005992 A1 | * | 1/2012 | Waldrop | B65B 5/04 53/473 |
| 2012/0090268 A1 | * | 4/2012 | Krauss | B65B 3/003 53/281 |
| 2012/0090727 A1 | * | 4/2012 | Hundeloh | B65B 3/18 141/1 |
| 2012/0151874 A1 | * | 6/2012 | Solano | B65B 3/02 53/268 |
| 2012/0301262 A1 | * | 11/2012 | Ivo | B23P 19/005 414/788 |
| 2014/0196407 A1 | * | 7/2014 | Ghirardello | B65B 55/103 53/426 |

FOREIGN PATENT DOCUMENTS

| | | |
|---|---|---|
| CN | 101569917 A | 11/2009 |
| CN | 201470808 U | 5/2010 |
| CN | 101920389 A | 12/2010 |
| CN | 201807697 U | 4/2011 |
| DE | 32 14 113 | 10/1983 |
| DE | 10 2005 015 032 | 10/2006 |

OTHER PUBLICATIONS

Search Report and Written Opinion as issued for International Application No. PCT/EP2012/067789, dated Nov. 2, 2012.
The First Office Action issued for Chinese Patent Application No. 201280046057.4, dated Jan. 6, 2015.

* cited by examiner

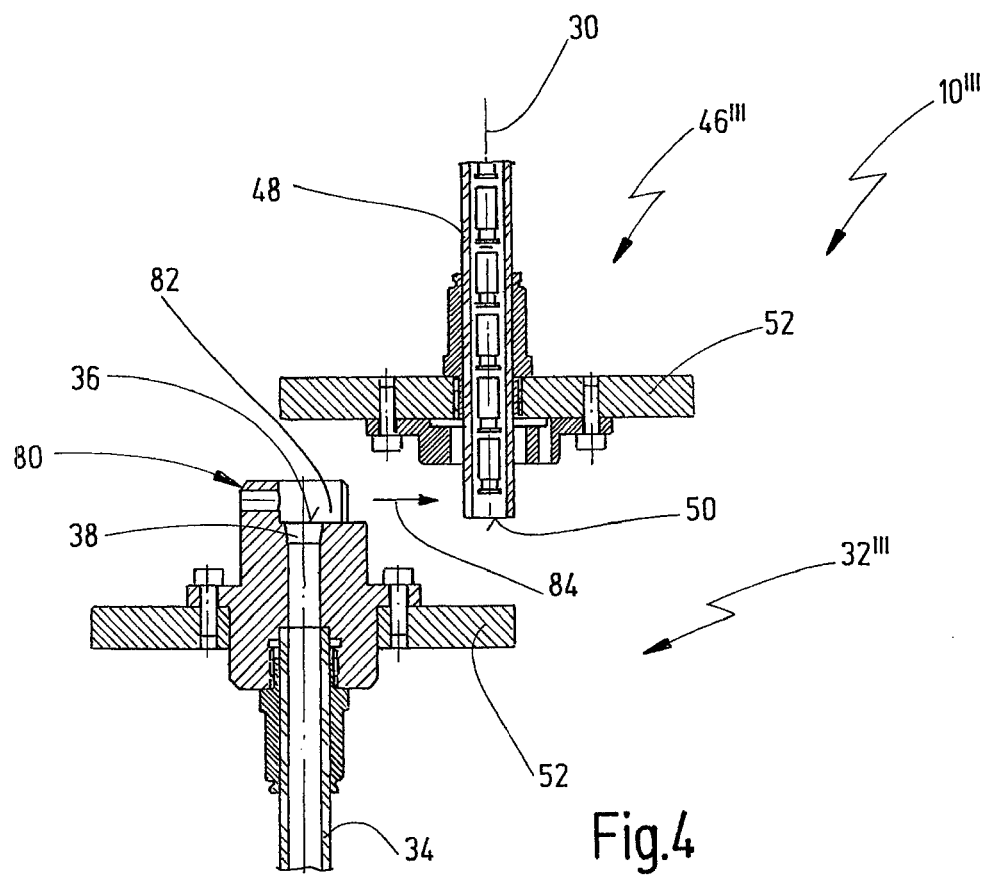
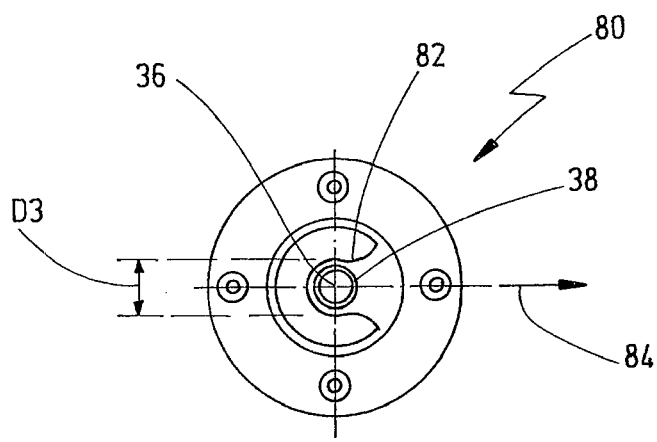

METHOD AND APPARATUS FOR FEEDING JOINING ELEMENTS

CROSS-REFERENCE TO RELATED APPLICATIONS

This application claims the benefit under 35 U.S.C. §119 (a)-(d) to German Patent Application No. 102011113832.7, entitled "Method and Apparatus for Feeding Joining Elements," filed Sep. 21, 2011, the contents of which are hereby incorporated by reference in their entirety.

BACKGROUND

Field

The present invention generally relates to a method and apparatus for feeding joining elements to a joining tool.

Description of Related Art

It is known in the field of joining technology to perform joining connections using joining elements. These methods comprise, for example, the joining of joining elements onto workpieces, the joining elements being used in this case frequently as anchors for further fastening means. Joining methods of this type are known in the form of stud welding, stud adhesion or thermoplastic stud joining. Here, the studs can be rotationally symmetrical joining elements, but can also be irregularly shaped anchors.

Furthermore, it is known to connect at least two workpieces to one another by means of joining elements. Methods of this type comprise, for example, riveting methods, such as the punch riveting method.

Joining methods of this type have been established in the field of vehicle technology for some years, in particular in body construction.

It is possible in general to carry out these joining methods by hand. Here, joining tools which frequently have a pistol-like grip are guided by hand. In mass production usage, however, it is preferred to move the joining tools by means of a programmable handling unit, such as a robot. In this case, it is likewise preferred if the joining elements are fed to the joining tool which is fastened to a robot arm. To this end, it is known to connect the joining tool to a feed device via a feed tube. Here, a proven method for feeding joining elements comprises feeding the joining elements through the feed tube by means of compressed or blown air.

A further known system connects the feed device to a docking station via a feed tube. In this case, there is a buffer store on the joining tool for receiving a plurality of joining elements. In order to fill the magazine, the joining tool is moved to the docking station and is docked there. Here, the docking takes place in such a way that both an outlet connection in the region of the docking station and an inlet connection of the buffer store are opened mechanically by the docking operation, in order to produce a continuous connection between the feed device and the buffer store. The outlay required here for mechanical actuating elements and gear mechanisms is considerable. Furthermore, docking and undocking is a relatively time-consuming process.

SUMMARY

According to an aspect of the invention, there is provided a method and apparatus for feeding joining elements to a joining tool, which is movable by a programmable handling unit. A magazine for receiving at least one joining element is mounted on the joining tool. The method comprises moving the magazine to a filling station that has a tubular section with an outlet opening. The method further comprises orienting an inlet opening of the magazine in relation to the outlet opening and conveying the at least one joining element to the tubular section such that the at least one joining element passes through the tubular section, the outlet opening, and the inlet opening into the magazine. During the orienting of the inlet opening of the magazine, the magazine may be oriented in relation to the outlet opening in such a way that the magazine is spaced apart from the filling station during the conveying of the at least one joining element.

According to an aspect of the invention, a laterally open radial guide section is arranged in the region of the inlet opening or in the region of the outlet opening. The radial guide section of the tubular section of the filling station or a tubular section of the magazine can be inserted into the region of the inlet opening or the region of the outlet opening in a direction transverse with respect to a conveying direction. The insertion may center the magazine in relation to the filling station.

According to an aspect of the invention, the filling station has a permanently continuous tubular section. The filling station thus does not need to have an outlet closure, via which the escape of joining elements out of the filling station is blocked. Such a filling station may be less mechanically complex.

According to an aspect of the invention, there is no inlet closure on the magazine. This facilitates the filling of the magazine in the filling station. In order to avoid joining elements exiting the filling station in an unimpeded manner, an inquiry may be made as to whether an inlet opening of the magazine is aligned with the outlet opening of the filling station. The inquiry may take place before initiation of a conveying and feeding step. Furthermore, an additional inquiry may be made as to whether a gas closure of the magazine is open. In an embodiment, the conveying and feeding of one or more joining elements by the feed device is not initiated until these conditions are met. A valve function can be integrated into the gas closure.

Both the operation of the magazine being moved to the filling station and the operation of the magazine being moved back from the filling station can be carried out more quickly by virtue of the fact that there do not have to be any actuating or gear mechanism elements which can be moved mechanically by a docking operation in the filling station.

According to an aspect of the invention, the magazine is designed for receiving a plurality of joining elements. Furthermore, the tubular section can be a rigid tubular section or a hose section which can be deformed elastically to a limited extent.

The orienting operation may take place by way of the handling unit. For this purpose, the latter is preferably taught the orientation position in advance.

The magazine can be loaded without docking or fixedly connecting the magazine and the filling station as a result of the measure of orienting the magazine in such a way that the magazine is spaced apart from the filling station. In particular, it is therefore possible to fill the magazine without a positively guided mechanical connection between the filling station and the magazine.

According to an aspect of the invention, the magazine is preferably fixed rigidly on the joining tool. In the present case, the fixing on the joining tool comprises the magazine being fixed at any desired point of a joining head that is guided by the handling unit.

According to an aspect of the invention, the programmable handling unit is a robot, on which the joining tool is fixed in a non-exchangeable manner. The magazine can be mounted on the joining tool either in an exchangeable manner or in a non-exchangeable manner. Furthermore, the joining tool can be fixed on the handling unit in an exchangeable manner. In some instances, moving the magazine to the filling station can comprise moving the joining tool with the magazine mounted on it to the filling station. In some instances, it is possible to temporarily remove the magazine from the joining tool and to move them individually to a filling station. In some instances, it is possible to remove the joining tool from the handling unit and to move only the handling unit with the magazine to a filling station.

According to an aspect of the invention, a sensor arrangement is used to detect whether the magazine has approached the outlet opening of the filling station. In some cases, the conveying of a joining element is initiated only when the sensor arrangement detects that the magazine has approached the outlet opening.

The sensor arrangement may detect just an approach of the magazine to the filling station, but can also detect whether the magazine is aligned in relation to the outlet opening. The sensor arrangement can include, for example, an optical, a magnetic, or an electric sensor, such as an electric contact or switch. In some embodiments, at least two individual sensors detect the approach of the magazine to the filling station, in order to achieve some redundancy. In order to detect the orientation, it can likewise be appropriate to use a plurality of sensors.

According to an aspect of the invention, an insertion section is formed between the inlet opening and a receiving section of the magazine. The insertion section may widen from the receiving section towards the inlet opening such that the joining element is centered during entry into the magazine.

According to an aspect of the invention, the receiving section serves to receive at least one joining element. In some instances, the receiving section receives a plurality of joining elements. Reliable transferring of joining elements from the filling station into the magazine can take place as a result of the insertion section, and can occur with the contactless orientation between the magazine and the filling station.

According to an aspect of the invention, a centering aid is arranged concentrically around the outlet opening in the filling station, which centering aid serves as an orientation aid during a teaching operation of the handling unit to teach an orientation position and/or which centering aid centers the joining element during a free flight phase between the outlet opening and the inlet opening.

The centering aid can be used to facilitate the teaching operation. In particular, however, the centering aid can serve to center the joining elements during a free flight phase, in which the joining elements move from the filling station to the magazine substantially without continuous guidance.

According to an aspect of the invention, the centering aid dips into the insertion section substantially without contact during the conveying step. This can ensure that jamming or blockages at the transfer region are prevented.

According to an aspect of the invention, one or more joining elements are fed to the filling station by compressed air and are conveyed without stopping through the outlet opening and the inlet opening into the magazine. For example, the feeding of one or more joining elements takes place in one operation through the filling station directly into the magazine.

According to an aspect of the invention, the centering aid has a centering cage comprising a plurality of webs which can be deflected radially and together form a conical shape.

Jamming or tilting can be prevented during the free flight phase with satisfactory process reliability as a result of the centering shape. In an embodiment, the filling station has a centering aid which is formed concentrically around the outlet opening so as to taper conically in the outlet direction. A diameter of a free end of the centering aid and a diameter of the inlet opening may be adapted to allow the centering aid to dip at least partially into the insertion section. In an embodiment, the dipping preferably takes place substantially without contact. Contact can possibly take place at most in the case of a radial deflection of the webs, but this is preferably to be avoided. The internal diameter of the free end of the centering aid may, for example, be slightly smaller than the external diameter of the joining elements to be conveyed. The dipping can prevent joining elements being lost during the filling operation. In addition, the centering aid can ensure reliable feeding of joining elements even when there is a slight misalignment between the magazine and the filling station. By having a filling operation that takes place substantially without contact of the filling station and the magazine, the operation of moving the magazine to the filling station or the operation of moving the magazine away from the filling station can be carried out more quickly because direct curves between the filling station and a following joining location can be programmed for the handling unit.

According to an aspect of the invention, centering takes place with a laterally open radial guide section. The magazine can be pulled off from the filling station not only in the filling direction, but also in the direction counter to the insertion direction into the radial guide section.

According to an aspect of the invention, the magazine can be centered precisely in relation to the filling station by the radial guide section, which is preferably formed by a U-shaped or by a V-shaped receptacle. This is the case, in particular, when the tubular section is a hose section which is elastically flexible to a limited extent, so that an ideal position which goes slightly beyond the alignment position can be programmed in, such that the hose section is possibly deformed slightly in an S shape when it is seated in the receptacle.

According to an aspect of the invention, a gas closure of the magazine can be actuated by means of an electrically actuable gas-closure actuator. In an embodiment, no magazine closure is provided, such that a mechanical opening of a closure by a docking operation at a docking station is not required. In this embodiment, the gas closure is opened in order to receive joining elements. The gas closure is subsequently closed so that joining elements can be transported by pressurized gas in the magazine after they have been fed to the magazine (i.e., following a pneumatic spring principle). The gas closure is opened and closed by a separate process, via which the gas-closure actuator is actuated. As a result, it is possible to open and close the gas closure of the magazine as a function of sensor-based detection of certain states. For example, the process for actuating the gas-closure actuator may wait for a signal of a proximity sensor, which confirms that the magazine has approached the filling station. The opening of the gas closure may take place as a function of a signal of a sensor arrangement that detects whether an outlet opening of the filling station is aligned with an inlet opening of the magazine.

The features mentioned above and still to be explained in the following text can be used not only in the respectively specified combination, but also in other combinations or on their own, without departing from the scope of the present invention.

Aspects of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein can be considered drawn to scale. It is to be expressly understood, however, that the drawings are for the purpose of illustration and description only and are not intended as a definition of the limits of the invention. It shall also be appreciated that the features of one embodiment disclosed herein can be used in other embodiments disclosed herein. As used in the specification and in the claims, the singular form of "a", "an", and "the" include plural referents unless the context clearly dictates otherwise.

BRIEF DESCRIPTION OF THE DRAWINGS

FIG. 4 shows a view of an embodiment of a joining assembly.

FIG. 5 shows a plan view of the magazine arrangement of FIG. 4.

DETAILED DESCRIPTION

Figure 1:
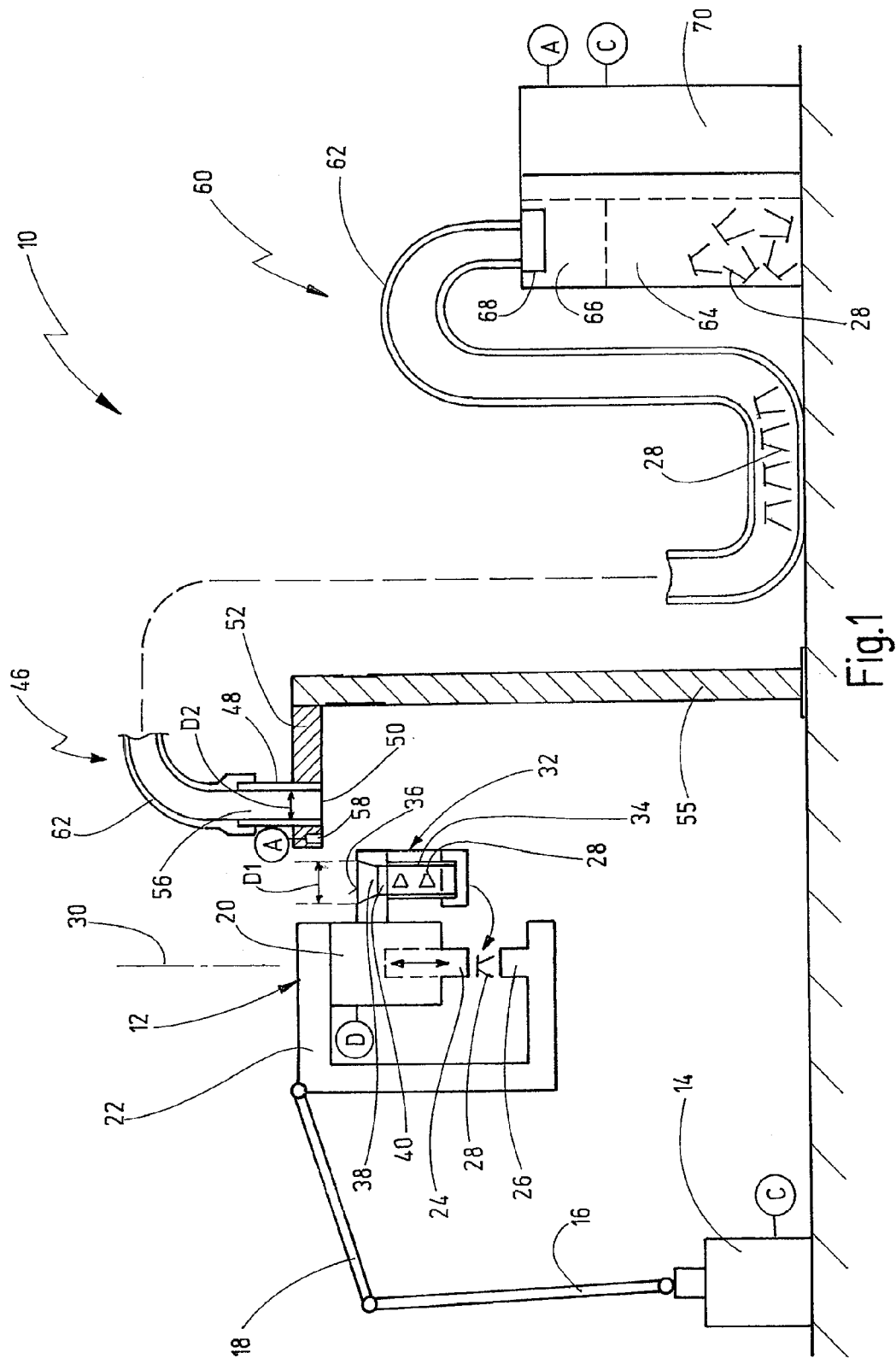
FIG. 1 shows a diagrammatic illustration of one embodiment of a joining assembly.

Referring now more particularly to the drawings, FIG. 1 illustrates one embodiment of a joining assembly 10 for producing joined connections by means of joining elements. In the present case, the joining assembly 10 is configured, in particular, for punch riveting. In a corresponding way, however, the joining assembly 10 can also be configured, for example, for producing stud joined connections (stud welding, stud adhesion, etc.).

The joining assembly 10 has a joining head 12 which is connected to a programmable handling unit in the form of a robot 14. In more precise terms, the robot 14 has, for example, a first arm 16 and a second arm 18, the joining head 12 being fixed on the second arm 18.

A joining tool 20 in the form of a punch riveting tool is fixed on the joining head 12. The joining tool 20 contains a C-frame 22. A ram 24 of the joining tool 20, which ram 24 can be moved in a joining direction, is mounted at an upper end of the C-frame 22. A die 26 is fixed at the other end of the C-frame 22.

The joining tool 20 is designed for carrying out joined connections by means of joining elements 28. In the present case, the joining elements 28 are punch rivet elements, in particular hollow punch rivet elements.

For example, two or more workpieces (for example in the form of metal sheets made from identical or different materials) can be inserted between the ram 24 and the die 26. These workpieces are subsequently connected by the fact that a punch rivet element is pressed into the workpiece arrangement by means of the ram 24. In the case of a hollow punch rivet, an originally substantially cylindrical hollow section is spread radially, with the result that an undercut is carried out within the workpiece arrangement.

The movement of the ram 24 generally takes place along a joining axis 30.

A magazine arrangement 32 is fixed on the joining tool 20 or the joining head 12. The magazine arrangement 32 has a magazine section or receiving section 34 for receiving at least one, preferably a plurality of joining elements 28.

Furthermore, the magazine arrangement 32 has an inlet opening 36 which is formed concentrically with respect to the magazine section 34 and has a diameter D1. The inlet opening 36 is connected to the magazine section 34 via an insertion section 38. The insertion section 38 widens from the magazine section 34 towards the inlet opening 36. In particular, the insertion section 38 is of conical configuration.

Furthermore, the magazine arrangement 32 has a magazine plate which preferably extends in a direction transverse with respect to the joining axis 30 and is preferably connected fixedly to the magazine section 34. A gas closure 40 which can be actuated by means of a gas-closure actuator is provided in the region of the magazine plate. The gas-closure actuator can move the gas closure 40 out of a closed position into an open position, in which joining elements 28 can be fed into the magazine section 34.

Furthermore, the joining assembly 10 has a filling station 46. The filling station 46 has a tubular section 48 which comprises an outlet opening 50. Furthermore, the filling station 46 has a filling-station plate 52, on which the tubular section 48 is fixed, in such a way that the outlet opening 50 is aligned substantially flush with a surface (not denoted in greater detail) of the filling-station plate 52. In an alternative, particularly preferred embodiment, the tubular section 48 can also protrude with respect to the surface of the filling-station plate 52, as is described in some following embodiments. The filling-station plate 52 is arranged in a stationary manner by means of a carrier 55 in the region of the operating range of the handling unit 14.

Furthermore, the tubular section 48 has a feed opening 56. Here, the tubular section 48 is configured in such a way that it is always continuous between the feed opening 56 and the outlet opening 50. In other words, no locking bolts or the like which could impede or block the passage through the tubular section 48 are provided in the region of the filling station 46.

Furthermore, a sensor arrangement 58 is fixed on the filling station 46, in particular on the filling-station plate 52. The sensor arrangement 58 can detect whether the magazine section 34 has approached the filling station 46. The sensor arrangement 58 can preferably detect if the magazine section 34 is oriented in relation to the filling station 46 in such a way that joining elements 28 can be transferred through the filling station into the magazine arrangement. In the aligned position, in particular, an inlet opening (not denoted in greater detail) of the magazine section 34 and the outlet opening 50 of the tubular section 48 are aligned with one another. The sensor arrangement can be a simple sensor arrangement, for example in the form of an optical, a magnetic or an electric sensor. In the simplest case, it can also be an electric contact or switch. It is preferred in some embodiments that at least two individual sensors detect the approach of the magazine to the filling station, in order to achieve a certain redundancy. In order to detect the orientation, it can likewise be appropriate to use a plurality of sensors.

The feed opening 56 of the tubular section 48 is connected to a feed hose 62 of a feed device 60. The feed device 60 comprises a stationary supply container 64 for receiving a multiplicity of joining elements 28. Furthermore, the feed device 60 comprises a separating device 66, in which the joining elements are separated. Finally, the feed device 60 comprises a conveying device, in particular in the form of a compressed-air assembly 68. Joining elements 28 can be conveyed through the feed hose 62 to the filling station 52 by means of the compressed-air assembly 68, as shown diagrammatically in FIG. 1. It is possible here to first of all convey conveying elements individually by the compressed-air assembly 68 into an intermediate position, to be precise preferably whenever a joining element has been joined by means of the joining tool 20. As soon as the magazine section 34 is empty, the quantity of joining elements 28 made available in the meantime can be fed through the filling station 46 into the magazine section 34 in one step immediately one after another without stopping.

Furthermore, the joining assembly 10 comprises a control device 70. The control device 70 is designed for controlling various individual processes and individual units of the joining assembly 10. Furthermore, the control device 70 also optionally serves to supply energy. It is shown, for example, that the control device 70 is connected to the sensor arrangement 58. Furthermore, the control device 70 is designed for actuating the gas-closure actuator 40. Furthermore, the control device 70 is preferably likewise designed for controlling the robot 14 according to a defined program. Furthermore, the control device 70 is also connected to the joining tool 20 and is designed, for example, for actuating the ram 24. Here, the control device 70 can be connected via a cable arrangement to the robot 14 and/or to the joining head 12. Furthermore, the control device 70 can be connected to the filling station 46 via a cable arrangement, in particular in the form of an individual sensor cable.

The joining assembly 10 is preferably operated as follows. Here, a state is assumed, in which a plurality of joining elements 28 are received in the magazine section 34. Here, the robot 14 moves the joining head 12 to a joining position, in which workpieces to be connected to one another are arranged between the ram 24 and the die 26. Subsequently, a joining element 28 is removed from the magazine section 34, as is indicated diagrammatically in FIG. 1 by an arrow. This removal can be carried out manually, but can preferably take place by means of a loading device which is actuated, for example, by means of the control device 70.

First of all, the ram 24 is moved, in order to carry out the actual joining process. Subsequently, the ram 24 moves back into its initial position, and the joining head 12 is moved to a next joining position, etc. As soon as there are no or only a small number of joining elements 28 in the magazine section 34, the joining head 12 is moved to the filling station 46. Here, the number of joining elements 28b situated in the magazine section 34 can be monitored by a sensor arrangement. However, it is preferred if the number of joining elements 28 in the magazine section 34 is always known by a controller which counts along in the control device 70.

As soon as the magazine plate 36 has approached the filling-station plate 52 and the outlet opening 50 is aligned with an inlet opening 36 of the magazine section 34, the gas-closure actuator 40 is actuated, in order to open the gas closure 40. Subsequently, a joining element 28 or a plurality of joining elements 28 is/are conveyed via the compressed-air assembly 68 unimpeded from the separating device 66 (or from a buffer store) into the magazine section 34, that is to say through the feed hose 62 and the tubular section 48 in an unimpeded manner.

As soon as the magazine section 34 is filled again, the gas closure is closed again by means of the gas-closure actuator, in order to achieve a gas closing-off which is sufficient for it to be possible to transport joining elements further by means of compressed gas.

Subsequently, the joining head 12 moves away from the filling station 46 and again carries out further joining operations.

The following figures show other embodiments of joining assemblies or feed devices and magazine arrangements which generally correspond to the corresponding elements of the joining assembly 10 of FIG. 1 with regard to structure and method of operation. Identical elements are therefore denoted by identical reference numerals.

Figure 2:
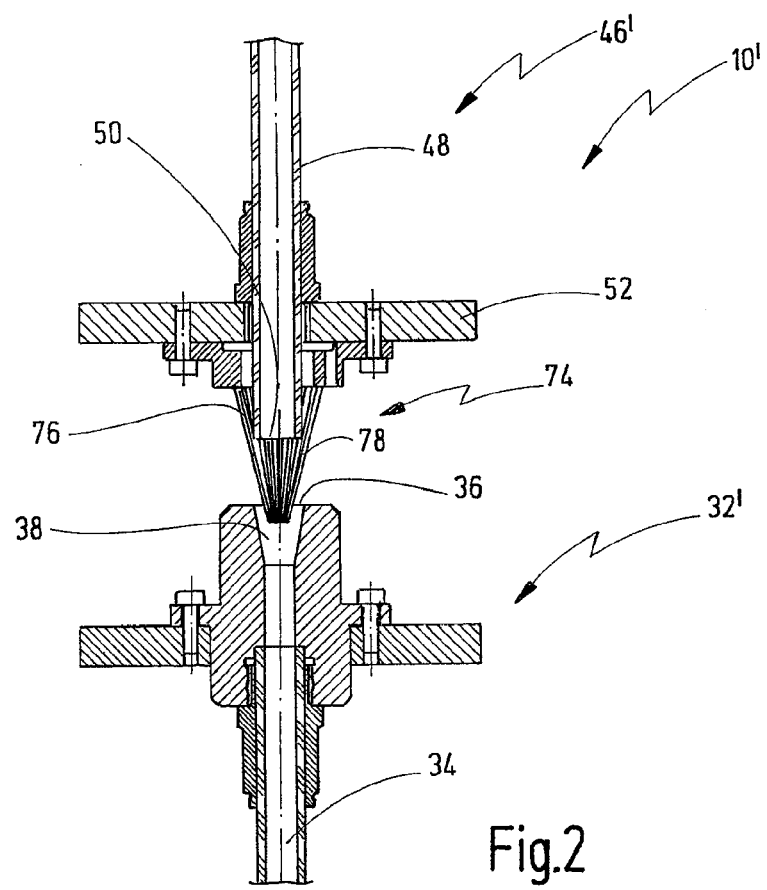
FIG. 2 shows a view of an embodiment of a joining assembly.

The embodiment shown in FIG. 2 of a joining assembly 10' comprises a filling station 46', in which the tubular section 48 protrudes with respect to an underside of the filling-station plate 52. A centering aid 74 in the form of a centering cage 76 is fixed on the filling-station plate 52 concentrically with respect to this protruding part of the tubular section 48. The centering cage 76 has a plurality of webs 78 which can be deflected radially and jointly enclose a conical shape. In the radially non-extended state, the external diameter of the free end of the centering cage 76 is smaller than the diameter of the inlet opening 36. Furthermore, the internal diameter of the free end of the centering cage 76 is smaller than the internal diameter of the tubular section 48.

FIG. 2 shows here that the free end of the centering cage 76 dips into the insertion section 38 without making contact with it.

When joining elements are fed through the tubular section 48, they exit out of the outlet opening 50. Here, the outlet opening 50 is spaced apart from the inlet opening 36 of the magazine arrangement 32'. During this free flight phase, the joining elements pass from the inside against the webs 78 of the centering cage 76 and deflect the said webs 78 radially to the outside, as a result of which they are centered in their free flight phase until they pass into the insertion section 38.

Furthermore, loss of joining elements between the outlet opening 50 and the inlet opening 36 can be prevented in this embodiment.

Furthermore, the centering cage 76 can be used as an orientation aid during teaching of the alignment position. Furthermore, slightly inaccurate positioning in the alignment position can be accepted as a result of the centering action by means of the centering cage 76.

Figure 3:
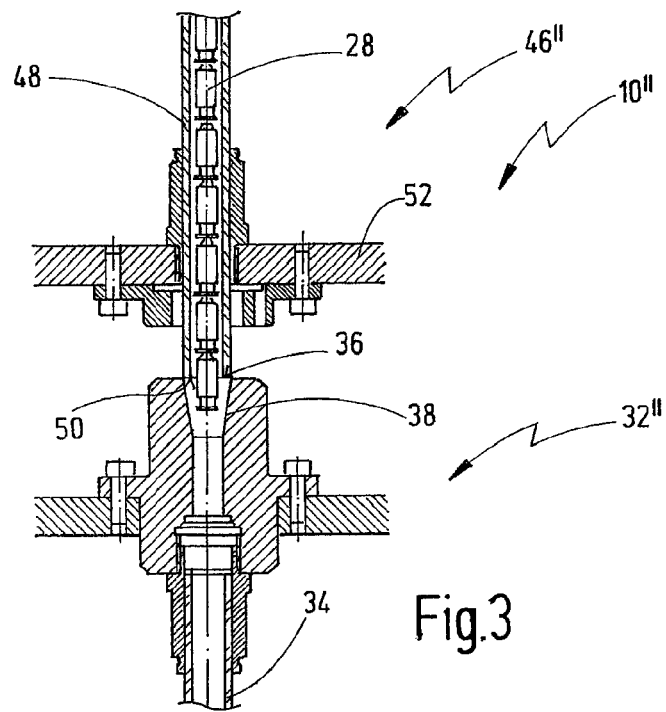
FIG. 3 shows a view of an embodiment of a joining assembly.

FIG. 3 shows a further embodiment of a joining assembly 10". In this, the tubular section 48 once again protrudes with respect to the underside of the filling-station plate 52. In the alignment position shown in FIG. 3, the free end of the tubular section is positioned with the outlet opening 50 directly above the inlet opening. Here, the diameter of the inlet opening 36 is preferably at least somewhat greater than the external diameter of the tubular section 48.

Here, the tubular section 48 and the magazine arrangement 32" preferably do not make contact with one another, but can do so. It is preferred in this embodiment if the handling unit 14 is programmed by means of a positioning aid.

FIGS. 4 and 5 show a further embodiment of a joining assembly 10'''. In this embodiment, the magazine arrangement 32''' has a radial guide section 80 above the insertion section 38, which radial guide section 80 is shown in plan view in FIG. 5. The radial guide section 80 comprises a receptacle 82 which is U-shaped in plan view and into which a protruding part of the tubular section 48 can be inserted in an insertion direction 84.

Here, the U-shaped receptacle 82 can be moved closer via a funnel section. In this embodiment, the tubular section 48 is preferably formed by a slightly flexible hose section of a feed hose. Inaccuracies during teaching of the handling unit 14 can be compensated for by the radial guide section 80.

The radial guide section 80, which is laterally open, may comprise a U-shaped or a V-shaped receptacle 82.

While the principles of the invention have been made clear in the illustrative embodiments set forth above, it will be apparent to those skilled in the art that various modifications may be made to the structure, arrangement, proportion, elements, materials, and components used in the practice of the invention.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. An apparatus for feeding joining elements, comprising:
   a joining tool that is movable by a programmable handling unit, the joining tool configured to perform a joining connection between two workpieces using at least one joining element;
   a magazine mounted on the joining tool and adapted to receive the at least one joining element, the magazine having an inlet opening;
   a filling station having a tubular section with an outlet opening, the tubular section adapted to feed the at least one joining element to the magazine so that, when the at least one joining element is being conveyed from the filling station into the magazine, the inlet opening of the magazine first receives the at least one joining element after the at least one joining element exits the filling station through the outlet opening, wherein the apparatus is adapted to convey the at least one joining element from the filling station into the magazine when the inlet opening of the magazine is aligned with the outlet opening of the filling station, and a control device that is programmed to control a relative position of the magazine and the filling station so that the magazine is spaced apart from the filling station when the at least one joining element is being conveyed from the filling station into the magazine,
   wherein the magazine has an insertion section between the inlet opening and a receiving section of the magazine, the insertion section widening from the receiving section towards the inlet opening such that the joining element is centered during entry into the magazine.

2. The apparatus of claim 1, wherein the filling station has a centering aid that is arranged concentrically around the outlet opening.

3. The apparatus of claim 2, wherein the centering aid has a centering cage that comprises a plurality of webs that are adapted to be deflectable radially and together form a conical shape.

4. The apparatus of claim 3, wherein the centering aid is formed concentrically around the outlet opening to taper conically in the outlet direction, wherein a diameter of a free end of the centering aid and a diameter of the inlet opening are adapted to allow the centering aid to dip at least partially into the insertion section.

5. The apparatus of claim 1, wherein a laterally open radial guide section is arranged in the region of the inlet opening or in the region of the outlet opening, wherein the radial guide section of the tubular section of the filling station or a tubular section of the magazine can be inserted into the region of the inlet of the opening or the region of the outlet opening in a direction transverse with respect to a conveying direction, in order to center the magazine in relation to the filling station.

6. The apparatus of claim 1, wherein the at least one joining element is a rivet or a stud.

7. The apparatus of claim 1, wherein the tubular section is a permanent continuously open tubular section so that the outlet opening is unblocked before aligning the inlet opening of the magazine with the outlet opening and after conveying the at least one joining element to the magazine.

8. The apparatus of claim 1, further comprising a sensor arrangement to detect whether the magazine has approached the outlet opening of the filling station.

9. An apparatus for feeding joining elements, comprising:
   a joining tool that is movable by a programmable handling unit, the joining tool configured to perform a joining connection between two workpieces using at least one joining element;
   a magazine mounted on the joining tool and adapted to receive the at least one joining element, the magazine having an inlet opening;
   a filling station having a tubular section with an outlet opening, the tubular section adapted to feed the at least one joining element to the magazine, and
   a control device that is programmed to control a relative position of the magazine and the filling station so that the magazine is spaced apart from the filling station and the inlet opening of the magazine is aliened with the outlet opening of the filling station when the at least one joining element is being conveyed from the filling station into the magazine,
   wherein the magazine has an insertion section between the inlet opening and a receiving section of the magazine, the insertion section widening from the receiving section towards the inlet opening such that the joining element is centered during entry into the magazine.

10. The apparatus of claim 9, wherein the filling station has a centering aid that is arranged concentrically around the outlet opening.

11. The apparatus of claim 9, wherein the at least one joining element is a rivet or a stud.

12. The apparatus of claim 9, wherein the tubular section is a permanent continuously open tubular section so that the outlet opening is unblocked before aligning the inlet opening of the magazine with the outlet opening and after conveying the at least one joining element to the magazine.

13. The apparatus of claim 9, further comprising a sensor arrangement to detect whether the magazine has approached the outlet opening of the filling station.

\* \* \* \* \*